(12) United States Patent
Liu et al.

(10) Patent No.: US 9,408,141 B1
(45) Date of Patent: Aug. 2, 2016

(54) SELECTING AN ACCESS NODE FOR COMMUNICATION IN A WIRELESS COMMUNICATION NETWORK

(71) Applicant: Sprint Spectrum LP, Overland Park, KS (US)

(72) Inventors: Chunmei Liu, Great Falls, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 14/198,426

(22) Filed: Mar. 5, 2014

(51) Int. Cl.
*H04W 4/00* (2009.01)
*H04W 48/20* (2009.01)

(52) U.S. Cl.
CPC ................................. *H04W 48/20* (2013.01)

(58) Field of Classification Search
CPC ..... H04W 36/00; H04W 36/14; H04W 24/10; H04W 48/20; H04W 48/12; H04W 48/02; H04W 8/22; H04W 48/08; H04W 48/16; H04W 36/0083; H04W 36/32; H04W 36/0066; H04W 36/0005; H04W 36/0055; H04W 36/0061; H04W 36/385; H04W 36/0094
USPC ................ 455/434, 436, 424, 441, 525, 437; 370/331
See application file for complete search history.

(56) References Cited

U.S. PATENT DOCUMENTS

| | | | | |
|---|---|---|---|---|
| 6,597,911 B1* | 7/2003 | Kransmo | .......... | H04W 36/0061 455/436 |
| 7,623,866 B1* | 11/2009 | Spitzer | .............. | H04W 36/0061 455/437 |
| 8,121,090 B1* | 2/2012 | Dinan et al. | ................... | 370/331 |
| 2004/0235478 A1* | 11/2004 | Lindquist | .......... | H04W 36/0083 455/440 |
| 2008/0240039 A1* | 10/2008 | Parekh | .................. | H04W 36/02 370/331 |
| 2008/0261598 A1* | 10/2008 | Tinnakornsrisuphap | | H04W 92/22 455/436 |
| 2009/0181676 A1* | 7/2009 | Lee | ..................... | H04J 11/0093 455/436 |
| 2009/0239535 A1* | 9/2009 | Chun | .................. | H04J 11/0069 455/435.2 |
| 2010/0075675 A1* | 3/2010 | Yang et al. | ..................... | 455/436 |
| 2010/0075716 A1* | 3/2010 | Chang | ............... | H04M 1/72519 455/558 |
| 2011/0013587 A1* | 1/2011 | Serravalle | ..................... | 370/331 |
| 2011/0045833 A1* | 2/2011 | Kazmi | .................. | H04W 36/24 455/436 |
| 2011/0206003 A1* | 8/2011 | Wu | ........................ | H04W 36/14 370/331 |
| 2013/0079017 A1 | 3/2013 | Mach et al. | | |
| 2013/0109381 A1* | 5/2013 | Takahashi | .............. | H04W 48/12 455/435.1 |
| 2013/0143550 A1* | 6/2013 | Ostrup et al. | ................. | 455/424 |

* cited by examiner

*Primary Examiner* — Mahendra Patel (57) ABSTRACT

A system and method of selecting an access node for communication in a wireless communication network are provided. A wireless device can receive a plurality of global cell identity messages, wherein each global cell identity message comprises an access node identifier. The wireless device can determine an access node classification for an access node associated with each global cell identity message. The access node classification can be determined based on each access node identifier. Each access node can be ranked based on the access node classification to determine a highest ranking access node. A signal characteristic of the highest ranking access node can be determined. Communication can be initiated with the highest ranking access node when the signal characteristic meets a threshold.

14 Claims, 5 Drawing Sheets

SELECTING AN ACCESS NODE FOR COMMUNICATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of access nodes can be implemented to maintain a communication link with a wireless device within a service area. Standard macrocell access nodes (e.g., an eNodeB) as well as additional short range, low power access nodes such as a microcell access node, a picocell access node, a femtocell access node, etc., can be deployed. The addition of short range, low power access nodes within a network can improve data throughput for users within a service area, increase capacity of the network within the service area, and increase coverage within the service area.

Access node selection can be based on which mode the wireless device is in while in communication with an access node. For example, when the wireless device is in an active mode and is transmitting and receiving data over the network, another access node can be selected to continue communication when the wireless device is moving between different cells in the network. When the wireless device is in an inactive or idle mode, the wireless device can select an access node on which to establish communication such that any paging messages addressed to the wireless device can be transmitted.

Overview

A system and method of selecting an access node for communication in a wireless communication network are provided. A wireless device can receive a plurality of global cell identity messages, wherein each global cell identity message comprises an access node identifier. The wireless device can determine an access node classification for an access node associated with each global cell identity message. The access node classification can be determined based on each access node identifier. Each access node can be ranked based on the access node classification to determine a highest ranking access node. A signal characteristic of the highest ranking access node can be determined. Communication can be initiated with the highest ranking access node when the signal characteristic meets a threshold.

Another system and method of selecting an access node for communication in a wireless communication network are provided. A first access node can receive from a wireless device a report message comprising a first global cell identity message and a second global cell identity message. The first global cell identity message can comprise a first access node identifier associated with a second access node. The second global cell identity message can comprise a second access node identifier associated with a third access node. An access node classification of the second access node and an access node classification of the third access node can be determined at the first access node based on the first access node identifier and the second access node identifier. The second access node and the third access node can be ranked based on the respective access node classifications to determine a highest ranking access node. A signal characteristic of the highest ranking access node can be determined. The wireless device can be instructed to establish communication with the highest ranking access node when the signal characteristic meets a threshold.

DETAILED DESCRIPTION

Figure 1:
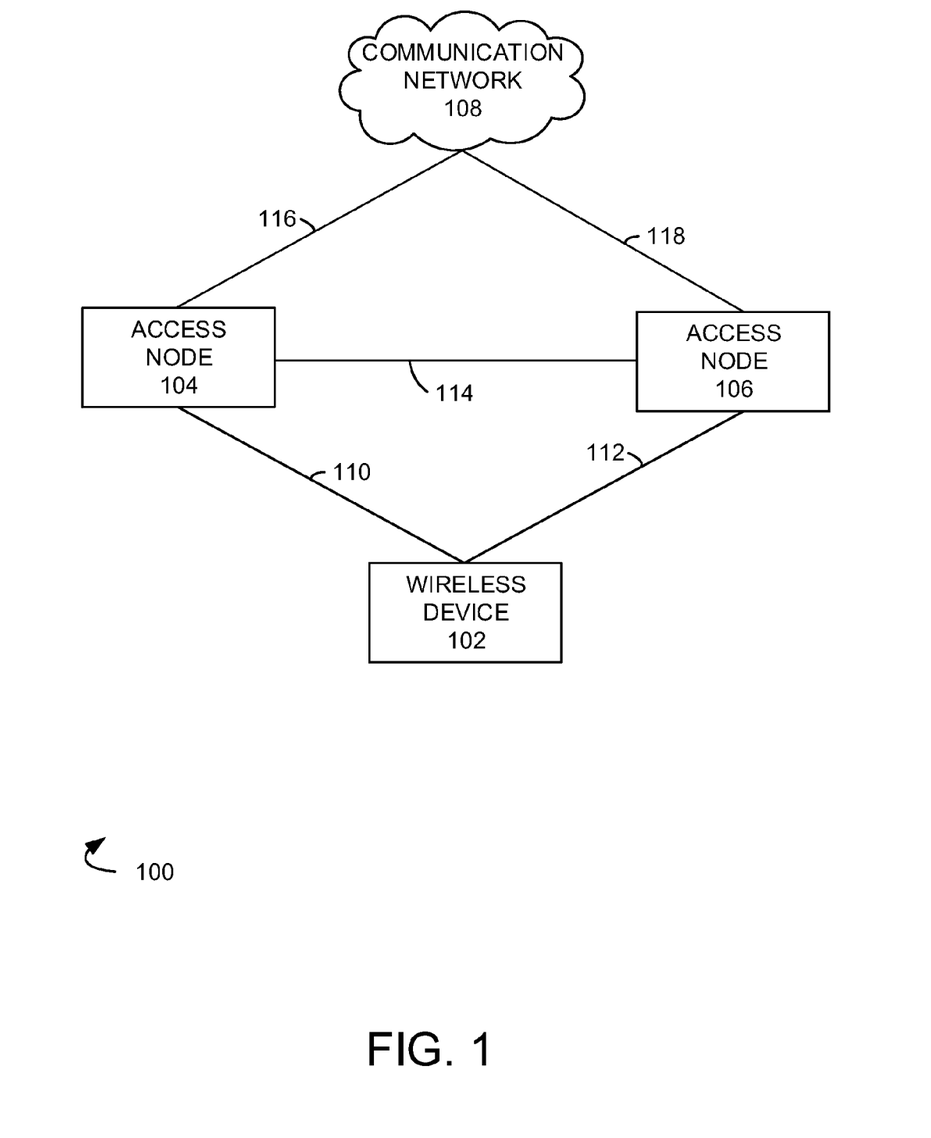
FIG. 1 illustrates a communication system to select an access node for communication in a wireless communication network.

FIG. 1 illustrates an exemplary communication system 100 for selecting an access node for communication in a wireless communication network. Communication system 100 can comprise a wireless device 102, access nodes 104, 106, and a communication network 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 104, 106 and communication network 108, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104 or 106, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different radio access technologies, the same or different network providers, and/or the same or different services. For example, wireless device 102 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 104 through communication link 110 or with access node 106 through communication link 112. Links 110, 112 can use various communication media, such as air, space, metal, optical fiber, or some other signal propagation path—including combinations thereof. Communication links 110, 112 may comprise many different signals sharing the same link Communication links 110, 112 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 104, 106 can be any network node configured to provide communication between wireless device 102 and communication network 108. Access nodes 104, 106 can be standard access nodes or short range, low power access nodes. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 104, 106 are illustrated in FIG. 1, any number of access nodes can be implemented within system 100.

Each access node can broadcast an identifying message such as a global cell identity message. The identifying message can provide a unique access node identifier such that each access node is associated with a different access node identifier. Network 100 can use the identifying message to determine the location of a wireless device based on each identifying message received by the wireless device. In an exemplary embodiment, the global cell identity message can be an E-UTRAN cell global identifier (ECGI). An ECGI can comprise the public land mobile network identifier (PLMN-ID) and an E-UTRAN cell identifier (ECI). The PLMN-ID is generally the same for each access node within network 100 and can be indicative of the network operator associated with the access node. The PLMN-ID can comprise a mobile country code (MCC) comprising 12 bits and a mobile network code (MNC) comprising 12 bits. The ECI can be indicative of the identity of the cell within the public land mobile network and is unique to each access node. The ECI can comprise an eNodeB identifier (ENB-ID) and a cell identifier. Cell identifiers comprise only 8 bits. Depending on the number of cells deployed in a network (i.e., when the number of access nodes deployed exceeds the 504 possible cell identifiers), the cell identifiers can be repeated within the same network. However, each ENB-ID can comprise 20 bits where the ENB-ID is unique to each access node within the network.

An access node identifier such as an ENB-ID can be modified such that a device can determine a type of access node that correlates to the global cell identity message based on the access node identifier. For example, the types of access nodes that can be deployed within network 100 can include macrocell access nodes, microcell access nodes, picocell access nodes, femtocell access nodes, or the like. In an embodiment, a number of bits, such as two, can be modified within the ENB-ID to reflect the type of access node. For instance, 00 can be indicative of a macrocell access node, 01 can be indicative of a picocell access node, 10 can be indicative of a microcell access node, and 11 can be indicative of a femtocell access node.

In addition, the access node identifier can be modified to further reflect a deployment identifier for each access node. The deployment identifier can reflect the various types of relief that the access node provides to the network 100. For example, each access node can be deployed to increase capacity in the network, to increase coverage within a service area, and/or to improve data throughput for mobile users. An increase in capacity can be based on the available spectrum associated with the access node, bandwidth available at the access node, a maximum number of wireless devices that can communication with the access node, etc. The coverage area can be increased to overcome issues with signal propagation within the service area such as shadowing, multipath fading, interference, coverage holes, etc. Data throughput can be based on the successful delivery of bits per second and can be influenced by various factors such as communication link characteristics, network resource utilization and/or modulation and coding schemes associated with the wireless device. Communication link characteristics can include a received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). Network resource utilization can include backhaul capacity, air-interface utilization, etc.

Access nodes 104, 106 can comprise a processor and associated circuitry to execute or direct the execution of computer-readable instructions to obtain information. Access nodes 104, 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 can receive instructions and other input at a user interface.

Access node 104 can be in communication with access node 106 through communication link 114. Access node 104 can be in communication with communication network 108 through communication link 116. Access node 106 can be in communication with communication network 108 through communication link 118. Communication links 114, 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 114, 116, 118 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 108 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

In operation, a wireless device such as wireless device 102 can receive a plurality of global cell identity messages. For example, each access node in a network can broadcast a global cell identity message such as an ECGI where the wireless device can receive a global cell identity message from each access node within a predetermined distance of the wireless device. Each global cell identity message can comprise an access node identifier. For example, the access node identifier can be an ECI where the ENB-ID portion of the ECI can be modified such that it is indicative of an access node classification and/or access node deployment identification. The wireless device can determine an access node classification for an access node associated with each global cell identity message. The access node classification can be determined based on each access node identifier. For example, the access node classification can be indicative of a type of access node such as a macrocell access node, a microcell access node, a picocell access node, a femtocell access node, etc. Each access node can be ranked based on the access node identifier to determine a highest ranking access node. Various factors can be used in ranking the access nodes such as a mobility characteristic, a mode characteristic, an application requirement of the wireless device, a capability characteristic of the wireless device, etc. A signal characteristic of the highest ranking access node can be determined and the wireless device can initiate communication with the highest ranking access node when the signal characteristic meets a threshold.

Figure 2:
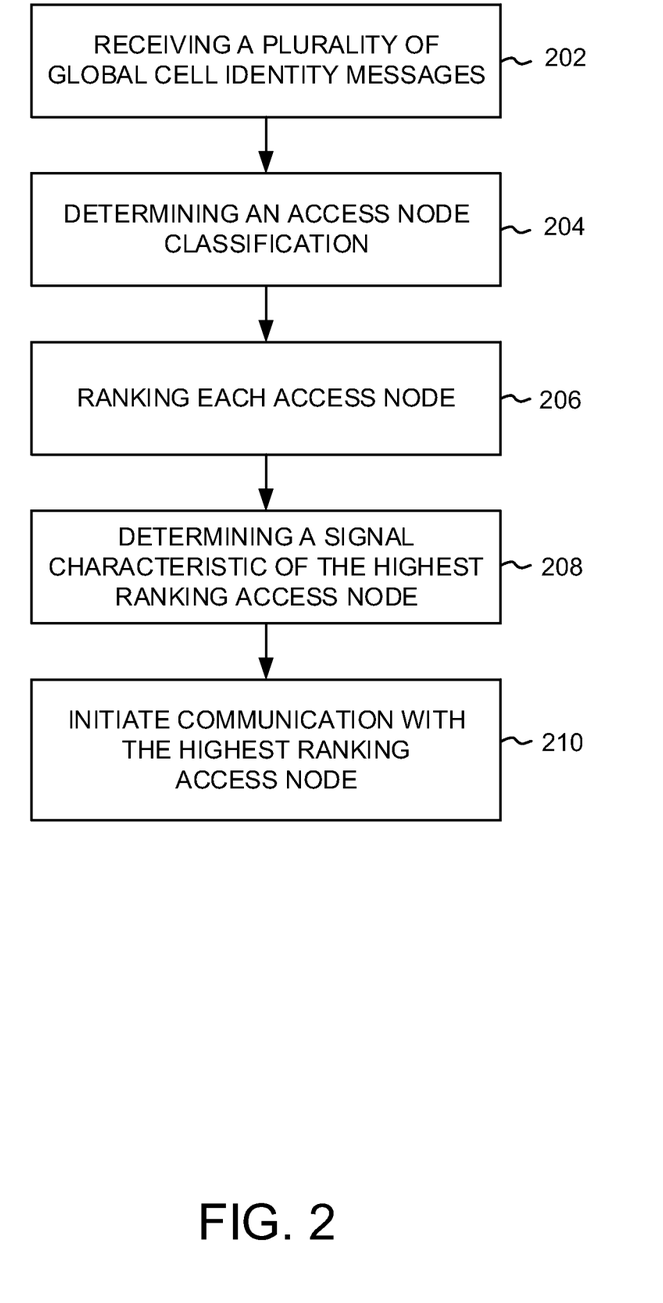
FIG. 2 illustrates an exemplary method of selecting an access node for communication in a wireless communication network.

FIG. 2 illustrates a flow chart of an exemplary method of performing a handover in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a wireless device can receive a plurality of global cell identity messages. The wireless device can receive global cell identity messages from each access node within a predetermined distance of the wireless device. For example, access nodes 104, 106 can each broadcast a unique global cell identity message such as an ECGI message to wireless device 102. Each global cell identity message can comprise an access node identifier such as an ENB-ID message. The access node identifier can comprise a plurality of modified bits where the modified bits can be used to determine an access node classification and/or deployment identification.

The wireless device can determine an access node classification for an access node associated with each global cell identity message at 204. For example, wireless device 102 can determine the access node classification for access nodes 104, 106 based on each access node identifier. In an exemplary embodiment, wireless device 102 can use the modified bits of the access node identifier to determine whether the access node is a macrocell node, a microcell node, a picocell node, a femtocell node, or the like.

In addition, wireless device 102 can use the same or different modified bits of the access node identifiers to determine an access node deployment identifier for each access node. Wireless device 102 can determine the purpose for the deployment of the access node. For example, whether the access node associated with the access node identifier is deployed to increase capacity in the network, to increase coverage within a service area, and/or to improve data throughput for mobile users.

Wireless device 102 can further determine various other factors associated with each access node. For example, wireless device 102 can determine a load of the network associated with each access node, a mobility of the wireless device, and/or an application requirement for any application running on the wireless device. The load of the network associated with each access node can be indicative of a data traffic load and/or a processing load of any or all nodes within network 100. The load can be based on a load within the evolved packet core (EPC), a load between the access node and any wireless device in communication with the access node, a bandwidth allocation at the access node, the number of wireless devices in communication with the access node, a maximum number of wireless devices in communication with the access node, etc. The mobility of the wireless device can be based on current mobility information such as time, speed, and direction in which the wireless device is traveling as well as past history mobility information. The application requirement of each application running on the wireless device can be based on at least one of a minimum data rate, a maximum permitted data delay, a minimum throughput, a minimum error rate, a maximum data loss rate, an application type, and a modulation and coding scheme.

At 206, the wireless device can rank each access node. For example, wireless device 102 can rank access nodes 104, 106 based on the access node identifier to determine a highest ranking access node. The ranking can be based on various factors such as at least one of the access node classification, the access node deployment purpose, the load of the network, the mobility of the wireless device, application requirements for any applications running on the wireless device, device capabilities such as current battery power, total battery lifetime, the mode of the wireless device (e.g., active, idle, etc.), the frequency bands in which the wireless device can support, the MCS modes in which the wireless device can support, the number of transceivers the wireless device has, the processor capabilities of the wireless device, history of data usage, physical hardware requirements of the wireless device, etc.

The ranking factors can be weighted based on various properties. For example, when the wireless device is running a real-time application such as voice over IP or video over IP and the wireless device has a high mobility, the highest ranking access node can be a macrocell access node to prevent multiple handovers. In another example, when the wireless device is running a non-real time application, the type of access node may be weighted less and the deployment purpose can be weighted more such that an access node can be selected to improve the overall network.

The wireless device can determine a signal characteristic of the highest ranking access node at 208. For example, wireless device 102 can receive a message indicative of the radio signal characteristic of the highest ranking access node. Wireless device 102 can request the signal characteristic reading of the access node after determining which access node is the highest ranking node. The radio signal characteristic can be indicative of signal quality and/or signal strength.

At 210, the wireless device can initiate communication with the highest ranking access node. For example, when access node 106 ranks higher than access node 104, wireless device 102 can compare the signal characteristic of access node 106 to a threshold signal characteristic value to determine whether to initiate communication with the highest ranking access node. When the signal characteristic meets the threshold signal characteristic value, wireless device 102 can initiate communication with access node 106 and discontinue communication with access node 104. Alternatively, when the signal characteristic of the highest ranking access node does not meet the threshold signal characteristic, wireless device 102 can determine a target access node based on predetermined reselection and/or handover criteria associated with the network. For example, the predetermined reselection and/or handover criteria can be pre-established by a network operator.

In a first exemplary embodiment, access node 106 can be a picocell access node deployed for the purpose of offloading macrocell access nodes. When wireless device 102 has a low speed mobility and is in idle mode moving from access node 104 to access node 106, wireless device 102 can receive all global cell identifier messages associated with the target access nodes. The wireless device can determine that access node 104 is a macrocell access node and access node 106 is a picocell access node based on the respective access node identifiers. Based on various factors such as the access node classification of access nodes 104, 106, deployment identification of access nodes 104, 106, and the mobility of the wireless device, wireless device 102 can rank the access nodes such that access node 106 has a higher reselection priority than access node 104. Wireless device 102 can determine the signal quality and/or signal strength of access node 106. In addition, a loading factor of access node 106 can be further determined. When the signal characteristic and/or the loading factor meet a threshold, wireless device 102 can initiate communication with access node 106.

In a second exemplary embodiment, access node 104 can be a picocell access node and access node 106 can be a macrocell access node. When wireless device 102 has a high speed mobility and is in idle mode, wireless device 102 can receive the global cell identifier messages associated with each target access node. The wireless device 102 can determine that access node 104 is a picocell node and that access node 106 is a macrocell access node based on the respective access node identifiers. Based on various factors such as the access node classification of access nodes 104. 106, deployment identification of access nodes 104, 106, and the mobility of wireless device 102, wireless device 102 can rank the access nodes such that access node 106 has a higher reselection priority than access node 104. Wireless device 102 can determine the signal quality and/or signal strength of access node 106. When the signal characteristic meets a threshold, wireless device 102 can initiate communication with access node 106.

In a third exemplary embodiment, when wireless device 102 is performing a cell selection during an initial network entry, the wireless device 102 can receive the global cell identifier messages associated with each possible target access node. The wireless device 102 can determine the type of each access node based on the access node identifiers. For example, access node 104 can be a macrocell access node and access node 106 can be a picocell access node. Based on various factors such as the access node classification of access nodes 104, 106, deployment identification of access nodes 104, 106, and the mobility of wireless device 102, wireless device 102 can rank the access nodes such that access node 106 has a higher reselection priority than access node 104. Wireless device can determine the signal quality and/or signal strength of access node 106 and when the signal meets a threshold, wireless device 102 can initiate communication with access node 106.

Figure 3:
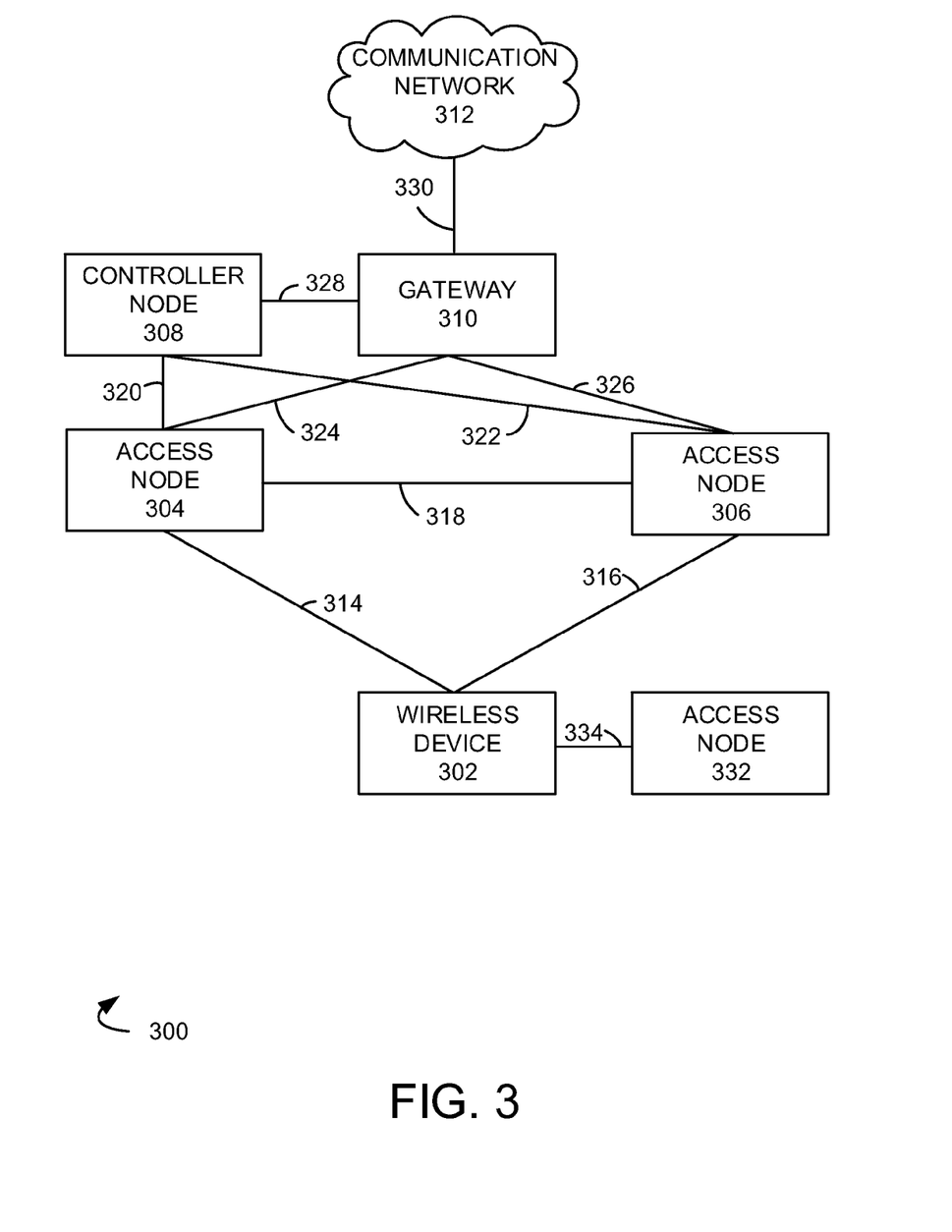
FIG. 3 illustrates another communication system to select an access node for communication in a wireless communication network.

FIG. 3 illustrates an exemplary communication system 300 for selecting an access node for communication in a wireless communication network. Communication system 300 can comprise a wireless device 302, access nodes 304, 306, 332, a controller node 308, a gateway 310, and a communication network 312. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 304, 306 and communication network 312, which are omitted for clarity, including additional processing nodes, routers, gateways, and physical and/or wireless data links for carrying data among the various network elements.

Wireless device 302 can be any device configured to communicate over communication system 300 using a wireless interface. For example, wireless device 302 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 3 as being in communication with access node 304 or 306, any number of wireless devices can be implemented according to various exemplary embodiments disclosed herein.

The wireless interface of wireless device 302 can include one or more transceivers for transmitting and receiving data over communication system 300. Each transceiver can be associated with the same or different frequency bands, the same or different radio access technologies, the same or different network providers, and/or the same or different services. For example, wireless device 302 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 302 can be in communication with access node 304 through communication link 314, with access node 306 through communication link 316, or with access node 332 through communication link 334. Links 314, 316, 334 can use various communication media, such as air, space, metal, optical fiber, or some other signal propagation path—including combinations thereof. Communication links 314, 316, 334 may comprise many different signals sharing the same link. Communication links 314, 316, 334 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 302 and access node 304 could share the same representative wireless link, but be transferred over different communication sessions, frequencies, timeslots, packets, ports, sockets, logical transport links, or in different directions—including combinations thereof.

Wireless device 302 can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 304, 306, 332 can be any network node configured to provide communication between wireless device 302 and communication network 312. Access nodes 304, 306, 332 can be standard access nodes or short range, low power access nodes. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node.

For ease of illustration, communication links between access node 332 and controller node 308 and gateway 310 are omitted for clarity. However, one of ordinary skill in the art would recognize that access node 332 could be in communication with controller node 308 and gateway 310. Alternatively, access node 332 could be in communication with a different controller node and/or gateway depending on where access node 332 is located within the network. It is noted that while three access nodes 304, 306, 332 are illustrated in FIG. 3, any number of access nodes can be implemented within system 300.

Each access node can broadcast an identifying message such as a global cell identity message. The identifying message can provide a unique access node identifier such that each access node is associated with a different access node identifier. Network 100 can use the identifying message to determine the location of a wireless device based on each identifying message received by the wireless device. In an exemplary embodiment, the global cell identity message can be an E-UTRAN cell global identifier (ECGI). An ECGI can comprise the public land mobile network identifier (PLMN-ID) and an E-UTRAN cell identifier (ECI). The PLMN-ID is generally the same for each access node within network 100 and can be indicative of the network operator associated with the access node. The PLMN-ID can comprise a mobile country code (MCC) comprising 12 bits and a mobile network code (MNC) comprising 12 bits. The ECI can be indicative of the identity of the cell within the public land mobile network and is unique to each access node. The ECI can comprise an eNodeB identifier (ENB-ID) and a cell identifier. Cell identifiers comprise only 8 bits. Depending on the number of cells deployed in a network (i.e., when the number of access nodes deployed exceeds the 504 possible cell identifiers), the cell identifiers can be repeated within the same network. However, each ENB-ID can comprise 20 bits where the ENB-ID is unique to each access node within the network.

An access node identifier such as an ENB-ID can be modified such that a device can determine a type of access node that correlates to the global cell identity message based on the access node identifier. For example, the types of access nodes that can be deployed within network 300 can include macrocell access nodes, microcell access nodes, picocell access nodes, femtocell access nodes, or the like. In an embodiment, a number of bits, such as two, can be modified within the ENB-ID to reflect the type of access node. For instance, 00 can be indicative of a macrocell access node, 01 can be indicative of a picocell access node, 10 can be indicative of a microcell access node, and 11 can be indicative of a femtocell access node.

In addition, the access node identifier can be modified to further reflect a deployment identifier for each access node. The deployment identifier can reflect the various types of relief that the access node provides to the network 300. For example, each access node can be deployed to increase capacity in the network, to increase coverage within a service area, and/or to improve data throughput for mobile users. An increase in capacity can be based on the available spectrum associated with the access node, bandwidth available at the access node, a maximum number of wireless devices that can communication with the access node, etc. The coverage area can be increased to overcome issues with signal propagation within the service area such as shadowing, multipath fading, interference, coverage holes, etc. Data throughput can be based on the successful delivery of bits per second and can be influenced by various factors such as communication link characteristics, network resource utilization and/or modulation and coding schemes associated with the wireless device. Communication link characteristics can include a received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). Network resource utilization can include backhaul capacity, air-interface utilization, etc.

Access nodes 304, 306, 332 can comprise a processor and associated circuitry to execute or direct the execution of computer-readable instructions to obtain information. Access nodes 304, 306, 332 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 304, 306, 332 can receive instructions and other input at a user interface.

Controller node 308 can be any network node configured to communicate information and/or control information over system 300. Controller node 308 can be configured to transmit control information associated with a handover procedure. Controller node 308 can be a standalone computing device, computing system, or network component, and can be accessible, for example, by a wired or wireless connection, or through an indirect connection such as through a computer network or communication network. For example, controller node 308 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 308 is not limited to any specific technology architecture, such as Long Term Evolution (LTE) and can be used with any network architecture and/or protocol.

Controller node 308 can comprise a processor and associated circuitry to execute or direct the execution of computer-readable instructions to obtain information. Controller node 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 308 can receive instructions and other input at a user interface.

Gateway 310 can be any network node configured to interface with other network nodes using various protocols. Gateway 310 can communicate user data over system 300. Gateway 310 can be a standalone computing device, computing system, or network component, and can be accessible, for example, by a wired or wireless connection, or through an indirect connection such as through a computer network or communication network. For example, gateway 310 can include a serving gateway (SGW) and/or a public data network gateway (PGW), etc. One of ordinary skill in the art would recognize that gateway 310 is not limited to any specific technology architecture, such as Long Term Evolution (LTE) and can be used with any network architecture and/or protocol.

Gateway 310 can comprise a processor and associated circuitry to execute or direct the execution of computer-readable instructions to obtain information. Gateway 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 310 can receive instructions and other input at a user interface.

Access node 304 can be in communication with access node 306 through communication link 318. Access node 304 can be in communication with controller node 308 through communication link 320. Access node 306 can be in communication with controller node 308 through communication link 322. Access node 304 can be in communication with gateway 310 through communication link 324. Access node 306 can be in communication with gateway 310 through communication link 326. Gateway 310 can be in communication with controller node 310 through communication link 328. Gateway 310 can be in communication with communication network 312 through communication link 330. Communication links 318, 320, 322, 324, 326, 328, 330 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 318, 320, 322, 324, 326, 328, 330 can be a direct link or might include various equipment, intermediate components, systems, and networks.

Communication network 312 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 312 can be capable of carrying data, for example, to support voice, push-to-talk, broadcast video, and data communications by a wireless device such as wireless device 302. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 can also comprise additional base stations, controller nodes, telephony switches, internet routers, network gateways, computer systems, communication links, or some other type of communication equipment, and combinations thereof.

In operation, a first access node, such as access node 304, can receiving from a wireless device, such as wireless device 302, a report message comprising a first global cell identity message and a second global cell identity message. For example, the first global cell identity message can comprise a first access node identifier associated with access node 306 and the second global cell identity message can comprise a second access node identifier associated with access node 322. The global cell identity message can be an ECGI and the access node identifier can be an ENG-ID. Access node 304 can determine an access node classification for access nodes 306, 332 based on the respective access node identifiers. The access node classification can be indicative of a type of access node such as a macrocell access node, a microcell access node, a picocell access node, a femtocell access node, etc. Access node 304 can rank access nodes 306, 332 based on the respective access node classifications and determine a signal characteristic of the highest ranking access node. Access node 304 can instruct wireless device 302 to establish communication with the highest ranking access node, such as access node 306, when the signal characteristic meets a threshold. When the signal characteristic does not meet the threshold, a target access node can be selected based on a predetermined process.

Figure 4:
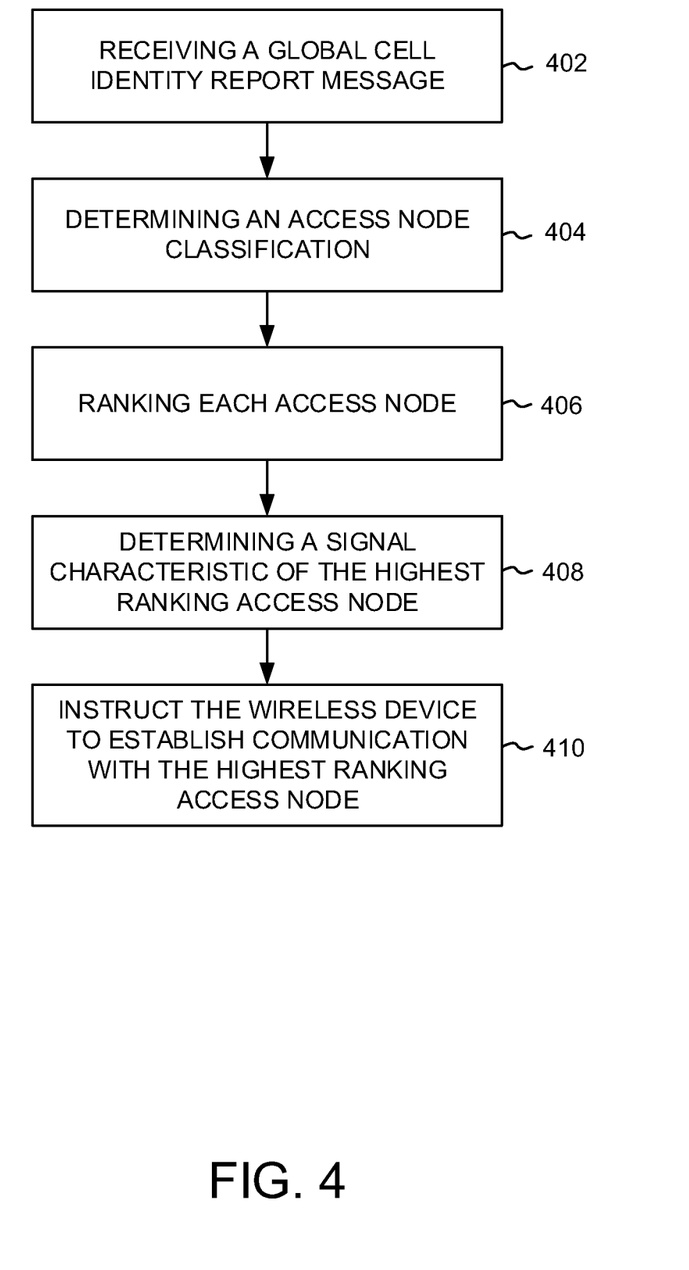
FIG. 4 illustrates another exemplary method of selecting an access node for communication in a wireless communication network.

FIG. 4 illustrates a flow chart of an exemplary method of performing a handover in a wireless communication network. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 402, an access node can receive a report message from a wireless device. For example, wireless device 302 can transmit the report message to the access node in which wireless device 302 has established communication. The report message can comprise a first global cell identity message and a second global cell identity message. However, the report message can include any number of global cell identity messages, where the number of global cell identity messages is based on a number of access nodes within a predetermined distance of the wireless device. Each global cell identity message can be associated with an access node. In an exemplary embodiment, the global cell identity message can be based on an ECGI message broadcast by each access node, where each global cell identity message is unique to the access node. Each global cell identity message can comprise an access node identifier such as an ENB-ID message. The access node identifier can comprise a plurality of modified bits where the modified bits can be used to determine an access node classification and/or deployment identification.

The access node can determine an access node classification for each global cell identity message comprised within the report message at 404. For example, access node 304 can determine the access node classification associated with access nodes 306, 322 based on each access node identifier. In an exemplary embodiment, the access node 304 can use the modified bits of the access node identifier to determine the type of access node such as a macrocell node, a microcell node, a picocell node, a femtocell node, or the like.

In addition, access node 304 can use the same or different modified bits of the access node identifiers to determine an access node deployment identification for each access node such that access node 304 can determine the purpose for the deployment of each access node. For example, whether the access node associated with the access node identifier is deployed to increase capacity in the network, to increase coverage within a service area, and/or to improve data throughput for mobile users.

Access node 304 can further determine various other factors associated with each access node. For example, wireless device 102 can determine a load of the network associated with each access node, a mobility of the wireless device, and/or an application requirement for any application running on the wireless device. The load of the network associated with each access node can be indicative of a data traffic load and/or a processing load. The load can be based on a load within the EPC, a load between the access node and any wireless device in communication with the access node, a bandwidth allocation at the access node, the number of wireless devices in communication with the access node, a maximum number of wireless devices in communication with the access node, etc. The mobility of the wireless device can be based on current mobility information such as time, speed, and direction in which the wireless device is moving as well as past history mobility information. The application requirement of each application running on the wireless device can be based on at least one of a minimum data rate, a maximum permitted data delay, a minimum throughput, a minimum error rate, a maximum data loss rate, an application type, and a modulation and coding scheme.

At 406, the access node can rank each access node. For example, access node 304 can rank access nodes 306, 322 based on the access node identifier to determine a highest ranking access node. The ranking can be based on various factors such as at least one of the access node classification, the access node deployment purpose, the load of the network, the mobility of the wireless device, application requirements for any applications running on the wireless device, device capabilities such as current battery power, total battery lifetime, the mode of the wireless device (e.g., active, idle, etc.), the frequency bands in which the wireless device can support, the MCS modes in which the wireless device can support, the number of transceivers the wireless device has, the processor capabilities of the wireless device, history of data usage, physical hardware requirements of the wireless device, etc.

The ranking factors can be weighted based on various properties. For example, when the wireless device is running a real-time application such as voice over IP or video over IP and the wireless device has a high mobility, the highest ranking access node can be a macrocell access node to prevent multiple handovers. In another example, when the wireless device is running a non-real time application, the type of access node may be weighted less and the deployment purpose can be weighted more such that an access node can be selected to improve the overall network.

The access node can determine a signal characteristic of the highest ranking access node at 408. For example, access node 304 can receive a message indicative of the radio signal characteristic of the highest ranking access node. The message indicative of the radio signal characteristic can be transmitted by wireless device 302 or another network node such as access node 306, etc. The radio signal characteristic can be indicative of signal quality and/or signal strength.

At 410, the access node can instruct the wireless device to establish communication with the highest ranking access node. For example, when access node 306 ranks higher than access node 322, access node 304 can compare the signal characteristic to a threshold signal characteristic value to determine whether to initiate communication with the highest ranking access node. When the signal characteristic meets the threshold characteristic value, access node 304 can instruct wireless device to establish communication with access node 306 and discontinue communication with access node 304. Alternatively, when the signal characteristic of the highest ranking access node does not meet the threshold signal characteristic, wireless device 302 can determine a target access node based on predetermined reselection and/or handover criteria associated with the network. For example, the predetermined reselection and/or handover criteria can be pre-established by a network operator.

In a first exemplary embodiment, access node 306 can be a picocell access node deployed for the purpose of offloading macrocell access nodes. When wireless device 302 has a low speed mobility and is in connected mode moving from access node 304 towards access nodes 306, 322, wireless device 302 can measure and report all global cell identifier messages associated with the target access nodes to access node 304. Access node 304 can determine that access node 306 is a picocell access node and access node 322 is a macrocell access node based on the respective access node identifiers. Based on various factors such as the access node classification of access nodes 306, 322, deployment identification of access nodes 306, 322, and the mobility of the wireless device, access node 304 can rank the access nodes such that access node 306 has a higher handover priority than access node 322. The signal characteristic of access node 306 such as signal quality and/or signal strength can be determined. In addition, a loading factor of access node 306 can be further determined. When the signal characteristic and/or the loading factor meet a threshold, access node 304 can instruct wireless device 302 to establish communication with access node 306.

In a second exemplary embodiment, access node 306 can be a macrocell access node and access node 322 can be a picocell access node. When wireless device 302 has a high speed mobility and is in connected mode moving from access node 304 towards access nodes 306, 322, wireless device 302 can measure and report all global cell identifier messages associated with the target access nodes to access node 304. Access node 304 can determine that access node 306 is a macrocell node and access node is a picocell access node based on the respective access node identifiers. Based on various factors such as the access node classification of access nodes 306, 322, deployment identification of access nodes 306, 322, and the mobility of the wireless device, access node 304 can rank the access nodes such that access node 306 has a higher handover priority than access node 322. The signal characteristic of access node 306 such as signal quality and/or signal strength can be determined. In addition, a loading factor of access node 306 can be further determined. When the signal characteristic and/or the loading factor meet a threshold, access node 304 can instruct wireless device 302 to establish communication with access node 306.

Figure 5:
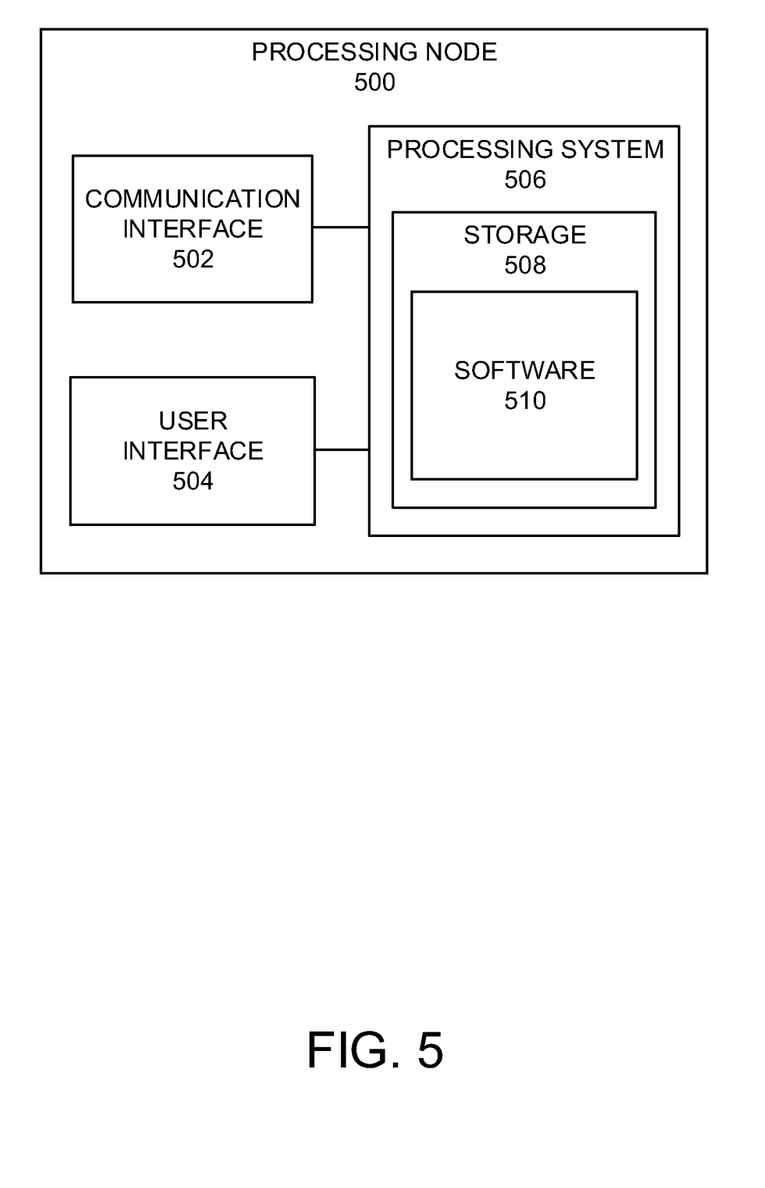
FIG. 5 illustrates a processing node according to an exemplary embodiment.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 can permit processing node 500 to communicate with other network elements. User interface 504 can permit the configuration and control of the operation of processing node 500.

Examples of processing node 500 include access nodes 104, 106, 304, 306, 322, controller node 308, and gateway 310. Processing node 500 can also be an adjunct or component of a network element, such as an element of access nodes 104, 106, 304, 306, 322, controller node 308, and gateway 310. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting an access node for communication in a wireless communication network comprising:
   receiving global cell identity messages associated with a plurality of access nodes at a wireless device, wherein each global cell identity message includes a unique access node identifier comprising a number of modified bits corresponding to a defined access node type;
   determining, based on the number of modified bits, an access node classification and deployment identifier for each of the plurality of access nodes;

ranking each access node using a weighted ranking factor, the weighted ranking factor being based at least on the access node classification and the deployment identifier associated with the access node;
selecting a highest ranking access node from the plurality of access nodes;
determining a signal characteristic of the highest ranking access node; and
initiating communication with the highest ranking access node when the signal characteristic meets a threshold.

2. The method of claim 1, further comprising:
selecting a target access node based on a predetermined process when the signal characteristic does not meet the threshold.

3. The method of claim 1, further comprising:
determining a load of the network associated with each access node;
determining a mobility of the wireless device; and
determining an application requirement for an application running on the wireless device,
wherein the ranking is further based on the load of the network associated with each access node, the mobility of the wireless device, and the application requirement for the application running on the wireless device.

4. The method of claim 1, wherein each global cell identity message comprises a EUTRAN cell global identifier (ECGI) message and each access node identifier comprises an eNodeB identifier.

5. A method of selecting an access node for communication in a wireless communication network, comprising:
receiving at a first access node from a wireless device a report message comprising a first global cell identity message and a second global cell identity message, wherein the first global cell identity message comprises a first access node identifier associated with a second access node and the second global cell identity message comprises a second access node identifier associated with a third access node;
determining, at the first access node, an access node classification of the second access node based on the first access node identifier and an access node classification of the third access node based on the second access node identifier, the first access node identifier and the second access node identifier each comprising a number of modified bits that correspond to a defined access node type and deployment identifier;
ranking the second access node and the third access node based on the respective access node classifications to determine a highest ranking access node;
determining a signal characteristic of the highest ranking access node; and
instructing the wireless device to establish communication with the highest ranking access node when the signal characteristic meets a threshold.

6. The method of claim 5, further comprising:
selecting a target access node based on a predetermined process when the signal characteristic does not meet the threshold.

7. The method of claim 5,
wherein the ranking is further based on the respective access node classifications and the respective access node deployment identifiers.

8. The method of claim 7, further comprising:
determining a load of the network associated with the second access node and the third access node;
determining a mobility of the wireless device; and
determining an application requirement for an application running on the wireless device,
wherein the ranking is further based on the load of the network associated with the second access node and the third access node, the mobility of the wireless device, and the application requirement for the application running on the wireless device.

9. The method of claim 5, wherein the first global cell identity message and the second global identity message comprise a EUTRAN cell global identifier (ECGI) message and the access node identifier comprises an eNodeB identifier.

10. A system for selecting an access node for communication in a wireless communication network, comprising:
a processing node configured to:
receive global cell identity messages associated with a plurality of access nodes, wherein each global cell identity message includes a unique access node identifier comprising a number of modified bits that correspond to a defined access node type;
determine, based on the number of modified bits, an access node classification and deployment identifier for each of the plurality of access nodes;
rank each access node using a weighted ranking factor, the weighted ranking factor being based at least on the access node classification and the deployment identifier associated with the access node;
select a highest ranking access node from the plurality of access nodes;
determine a signal characteristic of the highest ranking access node; and
initiating establishing communication with the highest ranking access node when the signal characteristic meets a threshold.

11. The system of claim 10, wherein the processing node is further configured to:
select a target access node based on a predetermined process when the signal characteristic does not meet the threshold.

12. The system of claim 10, wherein each global cell identity message comprises a EUTRAN cell global identifier (ECGI) message and each access node identifier comprises an eNodeB identifier.

13. The system of claim 10, wherein the processing node is an access node when the wireless device is in connected mode.

14. The system of claim 10, wherein the processing node is a wireless device when the wireless device is in idle mode or initial network entry mode.

* * * * *